(12) United States Patent
Chen et al.

(10) Patent No.: US 11,564,109 B2
(45) Date of Patent: Jan. 24, 2023

(54) APPARATUS TO ENABLE EHT MULTI-AP GROUP FORMATION IN A MULTI-AP NETWORK

(71) Applicant: Intel Corporation, Santa Clara, CA (US)

(72) Inventors: Cheng Chen, Portland, OR (US); Po-Kai Huang, San Jose, CA (US); Laurent Cariou, Portland, OR (US); Carlos Cordeiro, Portland, OR (US); Feng Jiang, Santa Clara, CA (US); Xiaogang Chen, Portland, OR (US); Qinghua Li, San Ramon, CA (US); Arik Klein, Givaat Shmuel (IL); Daniel F. Bravo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 16/893,871

(22) Filed: Jun. 5, 2020

(65) Prior Publication Data

US 2020/0305006 A1 Sep. 24, 2020

Related U.S. Application Data

(60) Provisional application No. 62/869,182, filed on Jul. 1, 2019, provisional application No. 62/858,480, filed on Jun. 7, 2019.

(51) Int. Cl.
*H04W 16/18* (2009.01)
*H04W 88/08* (2009.01)
*H04W 84/12* (2009.01)

(52) U.S. Cl.
CPC ............ *H04W 16/18* (2013.01); *H04W 84/12* (2013.01); *H04W 88/08* (2013.01)

(58) Field of Classification Search
CPC ..... H04W 16/18; H04W 84/12; H04W 88/08; H04W 24/02; H04W 88/12
See application file for complete search history.

(56) References Cited

U.S. PATENT DOCUMENTS

2015/0085844 A1* 3/2015 Tian ...................... H04W 36/08
370/338
2016/0337878 A1* 11/2016 Frederiksen .......... H04W 24/02
(Continued)

*Primary Examiner* — Pao Sinkantarakorn
*Assistant Examiner* — Kabir U Jahangir
(74) *Attorney, Agent, or Firm* — Schwegman Lundberg & Woessner, P.A.

(57) ABSTRACT

An access point (AP) station (STA) (AP STA) may be configured to operate as a multi-AP controller in a multi-AP network. A multi-AP group formation message is encoded for transmission to other APs in the multi-AP network. The multi-AP group formation message is encoded to notify the APs of the formation of an extremely-high throughput (EHT) multi-AP group, to designate whether an AP is a member of an EHT multi-AP group, and whether an AP can take the role of a coordinator AP or coordinated AP within the EHT multi-AP group. For multi-AP joint processing, the AP STA is further configured to encode an AP trigger frame for transmission to the APs in the multi-AP network. The AP trigger frame is to trigger physical layer (PHY) and medium-access control layer (MAC) parameter synchronization. The AP trigger frame is to trigger transmission of aggregated MAC protocol data units (A-MPDUs) by the APs that include MAC parameters and PHY parameters.

20 Claims, 9 Drawing Sheets

Multi-AP Group Formation message format

| Message type | Protocol | Value | Transmission type | Relay indicator field | Use CMDU Reliable Multicast? | Description |
|---|---|---|---|---|---|---|
| Multi-AP Group Formation message | EHT Multi-AP group formatoin | 0xxxxx (TBD) | Reliable multicast | 1 | Yes | A message to notify the formation of an EHT Multi-AP group within the Multi-AP network and the designation of the Coordinator AP for this group. |

(56) References Cited

U.S. PATENT DOCUMENTS

2018/0234135 A1* 8/2018 Vermani ............... H04B 7/0452
2021/0368391 A1* 11/2021 Fujimori ............... H04W 76/15
2021/0399838 A1* 12/2021 Lou ........................... H04L 1/08
2022/0070755 A1* 3/2022 Park ................... H04L 27/2601

* cited by examiner

AP1: Multi-AP Controller, Coordinator AP of EHT Multi-AP group 1
AP2: Multi-AP Agent, Coordinator AP of EHT Multi-AP group 2, Coordinated AP of EHT Multi-AP group 1
AP3: Multi-AP Agent, Coordinator AP of EHT Multi-AP group 3, Coordinated AP of EHT Multi-AP group 1
AP4: Multi-AP Agent, Coordinated AP of EHT Multi-AP group 2
AP5: Multi-AP Agent, Coordinated AP of EHT Multi-AP group 2
AP6: Multi-AP Agent, Coordinated AP of EHT Multi-AP group 3
AP7: Multi-AP Agent, Coordinated AP of EHT Multi-AP group 3

FIG. 4 Multi-AP Group Formation message format

| Message type | Protocol | Value | Transmission type | Relay indicator field | Use CMDU Reliable Multicast? | Description |
| --- | --- | --- | --- | --- | --- | --- |
| Multi-AP Group Formation message | EHT Multi-AP group formatoin | 0xxxxx (TBD) | Reliable multicast | 1 | Yes | A message to notify the formation of an EHT Multi-AP group within the Multi-AP network and the designation of the Coordinator AP for this group. |

| Field | Length | Value | Description |
|---|---|---|---|
| tlvType | 1 octet | 0xxx (TBD) | Multi-AP Group Information TLV. |
| tlvLength | 2 octets | Variable | Number of octets in ensuing field. |
| tlvValue | 1 octet | k | Number of EHT Multi-AP groups. |
| | 1 octet | variable | Multi-AP Group ID of the first Multi-AP group |
| | 1 octet | h | Number of APs in the identified Multi-AP group |
| | 1 octet | variable | The MAC address of the Coordinator AP in the identified Multi-AP group |
| | 1 octet | Variable | The MAC address of the 1$^{st}$ Coordinated AP in the identified Multi-AP group |
| | ... | ... | ... |
| | 1 octet | Variable | The MAC address of the (h-1)th Coordinated AP in the identified Multi-AP group |
| | The above fields is then repeated k – 1 times to cover all k Multi-AP groups. | | |

FIG. 5 Multi-AP Group Information TLV format

FIG. 6

FIG. 7 Sequence for DL operation

FIG. 8 UL sequence

APPARATUS TO ENABLE EHT MULTI-AP GROUP FORMATION IN A MULTI-AP NETWORK

PRIORITY CLAIMS

This application claims priority under 35 U.S.C. 119(e) to U.S. Provisional Patent Application Ser. No. 62/858,480, filed Jun. 7, 2019, and Ser. No. 62/869,182, filed Jul. 1, 2019 which are incorporated herein by reference in their entirety.

TECHNICAL FIELD

Embodiments pertain to wireless communications. Some embodiments relate wireless local area networks (WLANs) that operate in accordance with the IEEE 802.11 standards. Some embodiments relate to IEEE 802.11be Extremely High Throughput (EHT) (i.e., the IEEE P802.11-Task Group BE EHT) (Wi-Fi 7).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, an access point (AP) station (STA) (AP STA) may be configured to operate as a multi-AP controller in a multi-AP network. A multi-AP group formation message is encoded for transmission to other APs in the multi-AP network. The multi-AP group formation message is encoded to notify the APs of the formation of an extremely-high throughput (EHT) multi-AP group, to designate whether an AP is a member of an EHT multi-AP group, and whether an AP can take the role of a coordinator AP or coordinated AP within the EHT multi-AP group.

In some embodiments, if the multi-AP group formation message indicates that the AP STA is designated as the coordinator of the multi-AP group, the AP STA is further configured to encode the multi-AP group formation message to designate the other APs as coordinated APs of the EHT multi-AP group.

In some embodiments, the EHT multi-AP group is a subset of the multi-AP network, and the EHT multi-AP group is one of a plurality of EHT multi-AP groups within the multi-AP network. In some embodiments, the AP STA may be configured to select APs of the multi-AP network for inclusion in the EHT multi-AP group based on network topology, capabilities of the APs, and link conditions.

For multi-AP joint processing embodiments, the AP STA is further configured to encode an AP trigger frame for transmission to the APs in the multi-AP network. The AP trigger frame is to trigger physical layer (PHY) and medium-access control layer (MAC) parameter synchronization. The AP trigger frame is to trigger transmission of aggregated MAC protocol data units (A-MPDUs) by the APs that include MAC parameters and PHY parameters. In these embodiments, the AP STA may be configured to decode the A-MPDUs received from the APs.

In some embodiments, the AP trigger frame includes a multi-AP STA indication to be used as a receiver address (RA) for a joint transmission.

In some embodiments, the MAC parameters for the MAC synchronization include a MAC header information comprising frame control, duration, sequence control, quality-of-service (QoS) control and high-throughput (HT) control. In some embodiments, MAC parameters for the MAC synchronization further include MAC security header information comprising a packet number (PN) and a key identity (ID).

In some embodiments, the PHY parameters for the PHY synchronization may include a scrambling seed, a modulation and coding scheme (MCS), a coding rate, a guard interval (GI), a long-training field (LTF) length, LTF symbols, a PHY format, a transmission PHY preamble, and PHY padding or a packet extension.

In some embodiments, when multi-AP joint processing is to be performed by the AP STA, the AP STA may be configured to decode signaling provided the APs of the multi-AP network. The signalling from each of the APs may indicate a multi-AP basic-service set (BSS) color and a multi-AP BSSID.

Figure 1:
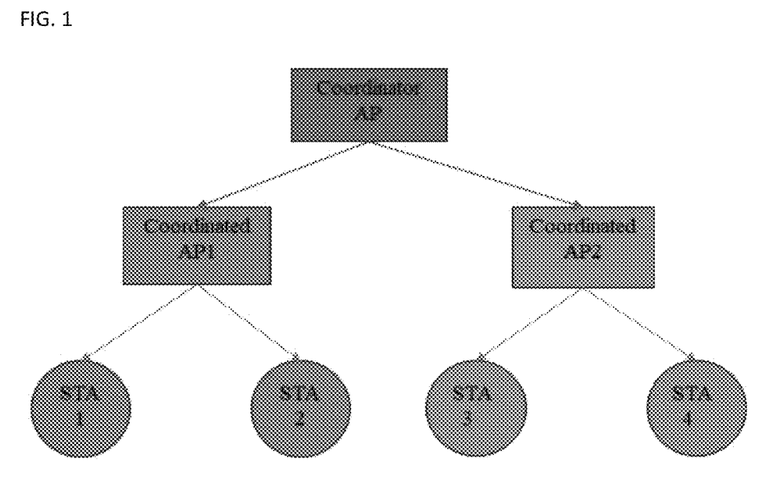
FIG. 1 illustrates an EHT multi-AP group in accordance with some embodiments.

FIG. 1 illustrates an EHT multi-AP group in accordance with some embodiments. Multi-AP operation is one of the candidate features for EHT amendment. There have been many proposals on how to leverage the PHY/MAC level coordination among multiple APs to achieve better performance, including coordinated techniques such as coordinated scheduling, coordinated beamforming, and coordinated OFDMA, and joint techniques such as joint processing, distributed MIMO etc. All these techniques assume the basic structure of an EHT Multi-AP group as follows: One AP acts as the Master or Coordinator AP, which can reach to other APs. The Coordinator AP controls or coordinates the schedule and transmission among all APs in the group. One or more APs act as the Slave or Coordinated APs. These APs receive control or schedule information from the Coordinator AP, and executes operation instructed by the Coordinator AP.

On the other hand, the Wi-Fi Alliance (WFA) has also developed technical spec for Multi-AP networks, where the coordination among multiple APs is primarily performed in the 1905.1 layer, which is a layer on top of different PHY and MAC protocols. The structure of the Multi-AP network defined in WFA Multi-AP spec is as follows, which is very similar to the Multi-AP group defined in EHT: One Multi-AP Controller, which provides onboarding functionality, receives measurements and capabilities, triggers control related commands and operations. One or more Multi-AP Agents, which executes commands received from the Controller, reports measurements and capabilities.

Figure 2:
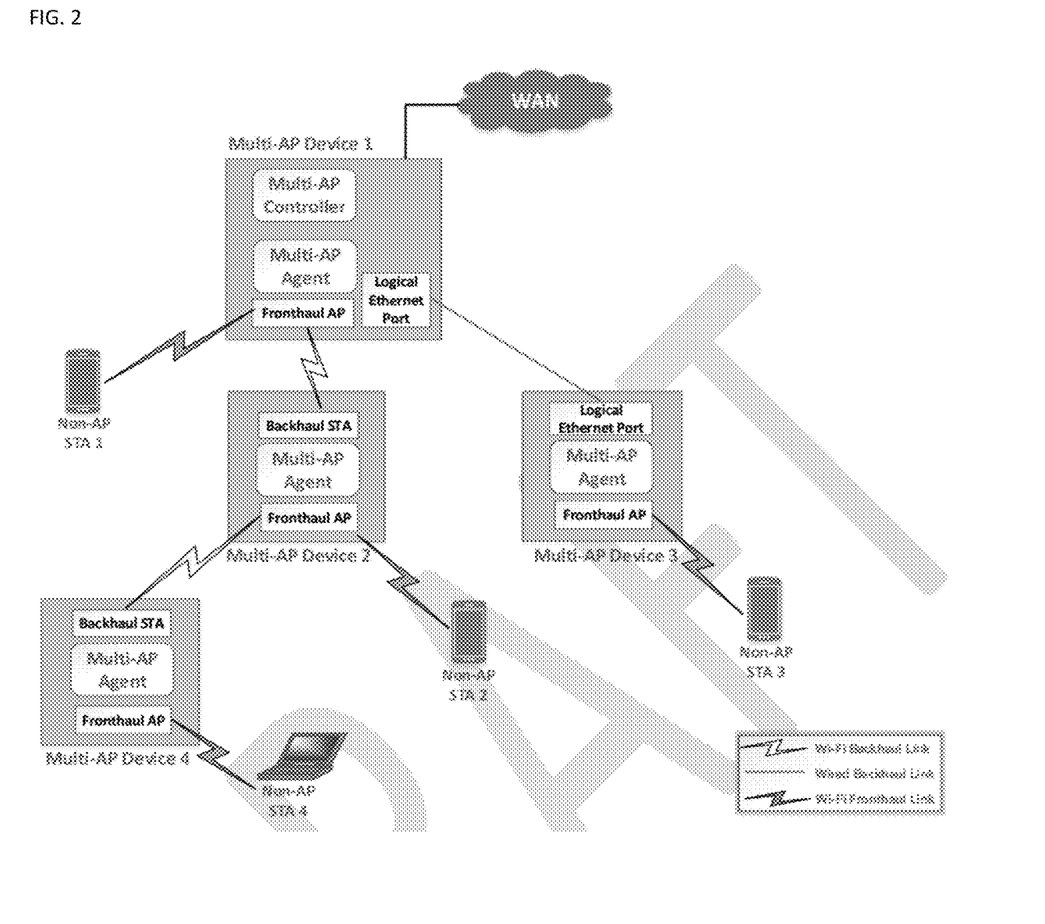
FIG. 2 illustrates a Multi-AP network in accordance with some embodiments.

FIG. 2 illustrates a WFA Multi-AP network in accordance with some embodiments. All EHT Multi-AP contributions so far have only focused on how to leverage the coordination within a Multi-AP group, by automatically assuming a Multi-AP group already exists, and Coordinator & Coordinated APs are already determined. In accordance with embodiments disclosed herein, we propose the framework of EHT Multi-AP group formation from WFA perspective. That is, define methods to enable EHT Multi-AP group formation within a Multi-AP network defined in WFA. The following documents are incorporated herein by reference. References: IEEE 802.11ax D4.0, IEEE 802.11 REVmd D2.0, IEEE 802.11ay D3.0 and Wi-Fi P2P Technical Specification v1.7.

The Coordinator AP-Coordinated AP structure adopted by EHT Multi-AP group is analogous to several other similar definitions in different specs.

1. "Controller-Agent" structure in Multi-AP network within WFA Multi-AP spec
   Multi-AP network is formed with user or service provider's deployment.
   Multi-AP Controller is configured through an out-of-band mechanism (e.g. through UI or Service Provider configuration)
   The only method to change the Controller is to perform a factory reset or reconfiguration through UI or SP interface, which is implementation specific.
2. "PCP-STA" structure in a PBSS within IEEE 802.11ad/ay spec
   The decision of whether a STA or its peer STA is the PCP depends on a comparison of their respective PCP factors.
   The PCP factor is the concatenation of the value of some of the fields from the DMG Capabilities element transmitted by the STA.
   For each peer STA reported as part of an MLME-SCAN-.confirm primitive or considered as part of a PCP handover, the STA proceeds as follows. If the STA's value of self_PCP_factor is greater than the value of peer_PCP_factor, the STA becomes a candidate PCP. Otherwise, the STA does not become a candidate PCP.
   Tie break mechanism is based on the STA's MAC address.
3. "P2P Group Owner-Client" structure in a P2P group within WFA Wi-Fi Direct spec
   P2P Group Owner may be set by configuration, or be determined through the Group Formation Procedure, which includes the Group Owner Negotiation.
   Group Owner Negotiation is a three-way frame exchange used to agree which P2P Device shall become P2P Group Owner and to agree on characteristics of the P2P Group.
   The metric to determine the Group Owner is the Group Owner Intent attribute
   A Tie Break bit is used to address cases where two devices have the same value in the Intent field in the Group Owner Intent Attribute.

Metric-based selection mechanisms as described in 2 and 3 in the preceding section may not work for an EHT Multi-AP group because:
   It is not necessarily true that all APs can hear each other. The metric-based selection mechanism can be easily complicated if there are multiple APs that want to become the Coordinator.
   Each pair of APs need to exchange the metric for Coordinator AP selection. The number of exchanges grow exponentially with the number of APs. (PCP selection in PBSS and Group Owner selection in a P2P group focus on a single pair of devices, so only need one such exchange).

Moreover, dynamic change of Coordinator AP is not preferred because:
   The topology within an EHT Multi-AP group is generally static.
   Once the Coordinator AP changes, how to ensure the Coordinated APs trust the new Coordinator AP?
   Once the Coordinator AP changes, all Coordinated APs and STAs within the group need to be notified. This will be a large overhead.

Considering these reasons, EHT Multi-AP group formation is more like a long-term configuration and should not change dynamically. As a result, one preferred method is to define the group formation of EHT Multi-AP group in WFA Multi-AP network, i.e., in 1905.1 layer.

Embodiments disclosed herein provide the framework to enable the group formation for EHT Multi-AP groups in 1905.1 layer using IEEE 1905.1 messages. The proposed EHT Multi-AP group formation method can be easily done in 1905.1 layer, and therefore is more flexible in terms of implementation.

Figure 3:
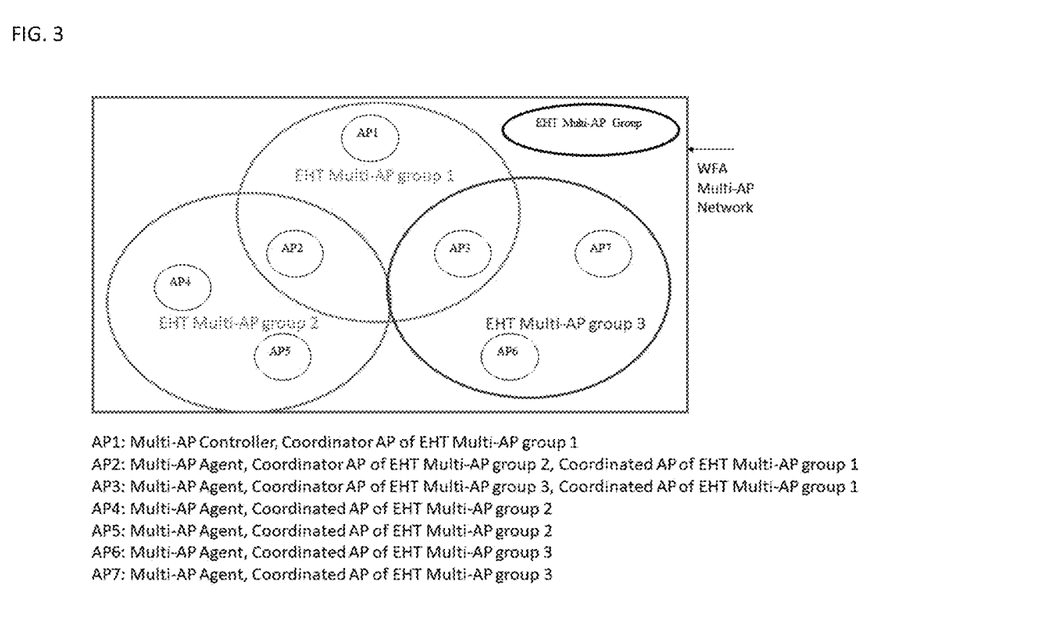
FIG. 3 illustrates forming multiple EHT Multi-AP groups within a Multi-AP network in accordance with some embodiments.

FIG. 3 illustrates forming multiple EHT Multi-AP groups within a WFA Multi-AP network in accordance with some embodiments. An EHT Multi-AP group can be defined a subset of WFA Multi-AP network. Within a WFA Multi-AP network, there can be multiple EHT Multi-AP groups. FIG. 3 shows an example of forming multiple EHT Multi-AP groups within a WFA Multi-AP network.

In accordance with embodiments, the determination of the Coordinator AP and Coordinated AP in each EHT Multi-AP group should be decided by the Multi-AP Controller in the Multi-AP network. The Multi-AP Controller is the only device that knows the most and the best about the topology, capabilities, link conditions etc. of all the devices in the whole Multi-AP network. As a result, it can make the best decisions based on various types of information it collects. However, how to make the decision, i.e., what are the metrics to determine the Coordinator AP in each Multi-AP group should be implementation specific. Propose to define a new 1905.1 message called Multi-AP Group Formation message to enable the Controller to create an EHT Multi-AP group and designate the Coordinator AP for this group. The Multi-AP Controller shall send this message to all APs that are members of the formed EHT Multi-AP groups identified in this message. Once received, each AP will know which Multi-AP group it is a member of, and whether it is the Coordinator AP or Coordinated AP in that group.

Figure 4:
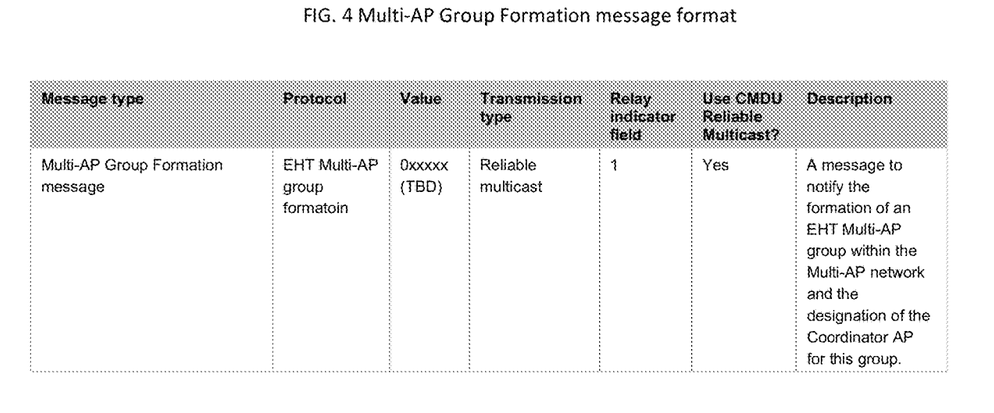
FIG. 4 illustrates a Multi-AP Group Formation message format in accordance with some embodiments.
Figure 5:
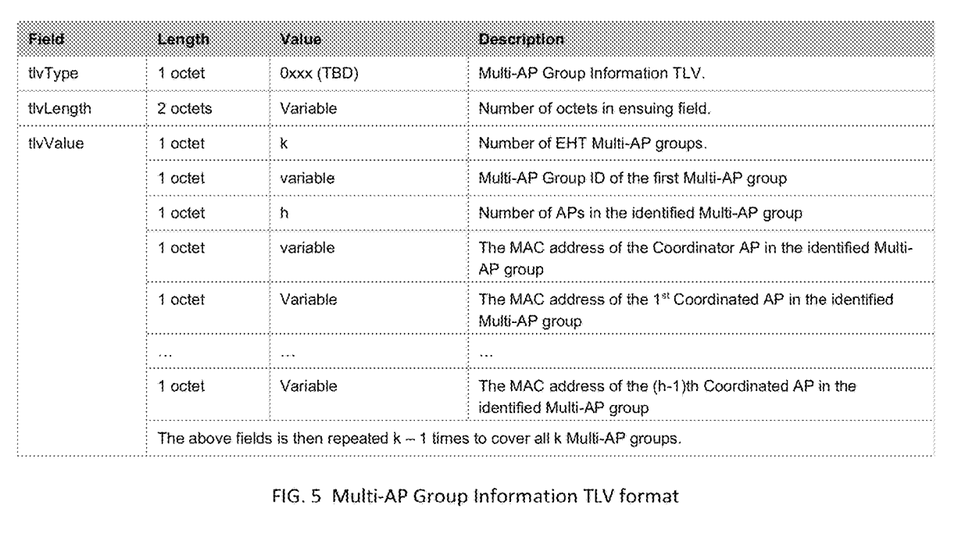
FIG. 5 illustrates a Multi-AP Group Information type-length-value (TLV) format in accordance with some embodiments.

FIG. 4 illustrates a Multi-AP Group Formation message format in accordance with some embodiments. The following TLV should be included in this message: One or more Multi-AP Group Information TLV. FIG. 5 illustrates a Multi-AP Group Information TLV format in accordance with some embodiments.

Figure 6:
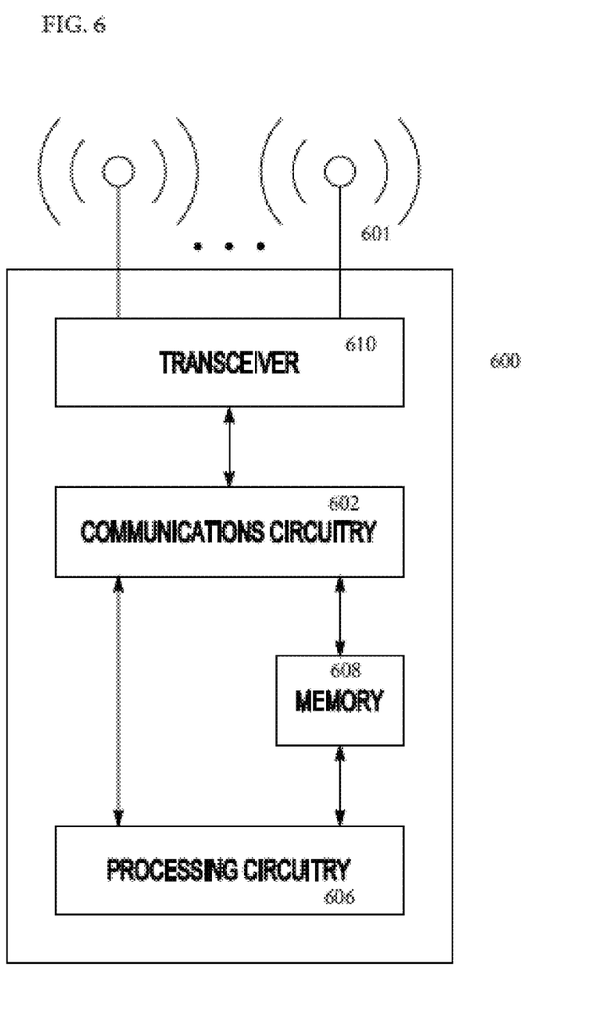
FIG. 6 illustrates a functional diagram of an exemplary communication station that may be suitable for use as an access point in accordance with some embodiments.

FIG. 6 illustrates a functional diagram of an exemplary communication station that may be suitable for use as an access point in accordance with some embodiments. Communication station 600 may be suitable for use as an AP or a user device (e.g., a STA) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

One of the technical direction for EHT is Multi-AP operation. With this concept, a Master AP can send a trigger frame to multiple coordinated APs (including the coordinator AP) in order to enable a synchronized transmission by the coordinated APs.

BSS Color field is included in HE-SIGA so that an HE STA can determine if the received PPDU is from its own BSS (intra-BSS PPDU) or from another BSS (inter-BSS PPDU). Each BSS has a BSS color (as unique as possible) that is known by all STAs. If the BSS Color in the BSS color field in the HE-SIGA of the received PPDU is the color of the BSS, then the STAs associated with this BSS treat this PPDU as an intra-BSS PPDU, otherwise, they treat it as an inter-BSS PPDU. If the BSS color value is 0 or if there is no color, then the STA cannot classify the PPDU as either intra-BSS or inter-BSS. (Note that there are other ways to classify).

If the received PPDU is an inter-BSS PPDU, then the receiving STA may perform spatial reuse. If the received PPDU is an intra-BSS PPDU, then the receiving STA may perform intra-PPDU power save. Also, the receiving STA will maintain 2 NAVs, an intra-BSS NAV and a basic NAV.

This issue comes with Multi-AP sequences of transmission, because within one TxOP, multiple APs will be transmitting, and the following as needed:

STAs associated with each AP that is part of the Multi-AP TxOP have to treat the sequence as being intra-BSS STAs associated with each AP that is part of the Multi-AP TxOP have to treat a single AP sequence as intra-BSS.

Therefore, a BSS Color that is unique per BSS/AP as needed, but a way as needed so that STAs from different APs treat a multi-AP sequence as intra-BSS, while there are multiple BSS colors involved.

Example embodiments of the present disclosure relate to systems, methods, and devices for BSS Color for Multi-AP UL operation.

In one embodiment, a BSS Color for Multi-AP UL operation system may use BSS Color 0, which is a special value that makes a STA not classify the PPDU neither as an intra or inter-BSS PPDU, to ensure protection from flax devices for a specific duration during a Multi-AP sequence, or for a portion of the Multi-AP sequence.

In one embodiment, a BSS Color for Multi-AP UL operation system may define a specific BSS Color for a multi-AP group, as if a group of APs (including a coordinator AP and coordinated APs) was a virtual AP, in addition to a BSS Color that is specifically assigned to one AP.

In one or more embodiments, a multi-AP group with one coordinator AP and 2 coordinated APs will then have 4 Colors: one for each BSS (coordinator and coordinated AP), and one for the virtual group of APs.

It should be noted that there could be multiple groups of APs, in which case there could be multiple Group BSS Colors.

In one embodiment, a BSS Color for Multi-AP UL operation system may define a new behavior on the extreme high throughput (EHT) STA so that it is made aware of the BSS Color of its associated AP as for HE operation, and is made aware of the Color of the virtual group of APs that its AP participate in. And the rule that it will treat as intra-PPDU a PPDU that contains either the BSS Color of its associated AP, or the BSS Color of the Virtual group of APs (that include its associated AP).

FIGS. 7-10 depict illustrative schematic diagrams for BSS Color for Multi-AP UL operation, in accordance with one or more example embodiments of the present disclosure.

Figure 7:
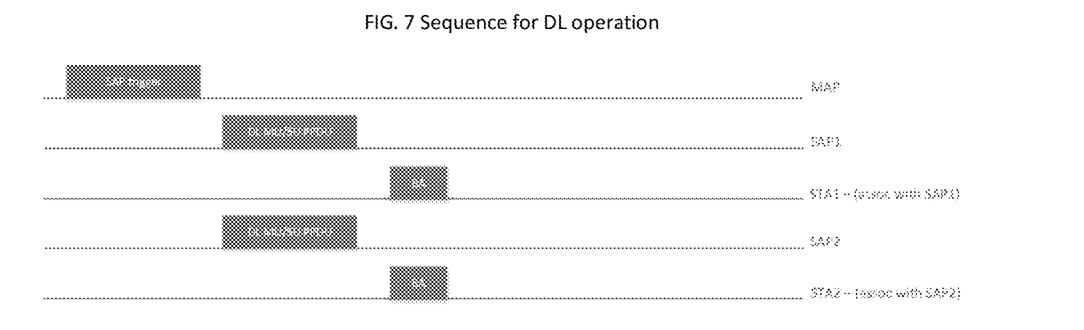
FIG. 7 illustrates a sequence for DL operation in accordance with some embodiments.

The typical sequence is for a DL scenario as shown in FIG. 7, where the coordinated APs will transmit in DL to their STAs.

Figure 8:
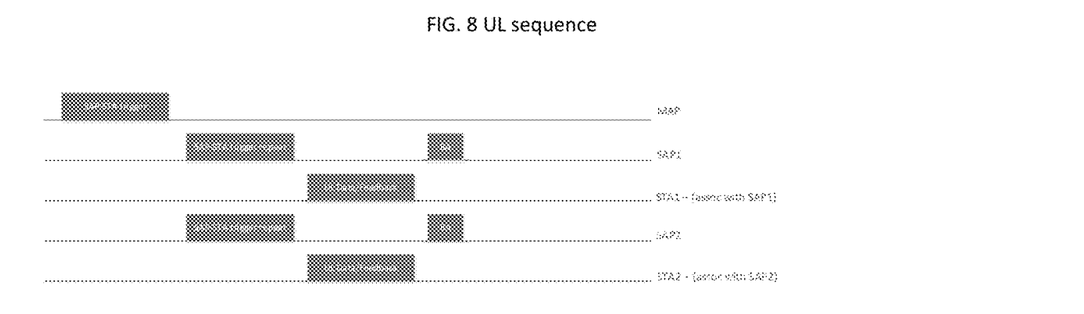
FIG. 8 illustrates a sequence for UL operation in accordance with some embodiments.

The sequence can be adapted for an UL scenario as shown in FIG. 8, where the coordinated APs will transmit at trigger frame to trigger a response from their STAs: For collecting feedbacks from STAs, For triggering UL data from STAs.

In one or more embodiments, a BSS Color for Multi-AP UL operation system may use BSS Color 0, which is a special value that makes a STA not classify the PPDU neither as an intra or inter-BSS PPDU, to ensure protection from 11ax devices for a specific duration during a Multi-AP sequence, or for a portion of the Multi-AP sequence.

In one or more embodiments, a BSS Color for Multi-AP UL operation system may define a specific BSS Color for a multi-AP group, as if a group of APs (including a coordinator AP and coordinated APs) was a virtual AP, in addition to a BSS Color that is specifically assigned to one AP.

A multi-AP group with one coordinator AP and 2 coordinated APs will then have 4 Colors: one for each BSS (coordinator and coordinated AP), and one for the virtual group of APs. Note that there could be multiple groups of APs, in which case there could be multiple Group BSS Colors.

In one or more embodiments, a BSS Color for Multi-AP UL operation system may define a new behavior on the EHT STA so that it is made aware of the BSS Color of its associated AP as for HE operation, and is made aware of the Color of the virtual group of APs that its AP participate in. And the rule that it will treat as intra-PPDU a PPDU that contains either the BSS Color of its associated AP, or the BSS Color of the Virtual group of APs (that include its associated AP).

In one or more embodiments, a BSS Color for Multi-AP UL operation system may facilitate that Multiple options are possible depending on the design choice of the EHT preamble In one or more embodiments, a BSS Color for Multi-AP UL operation system may facilitate that the EHT preamble design, is reusing the structure of HE-SIGA at least the BSS Color and probably TxOP duration fields in HE-SIGA, so that an HE STA can also receive and detect the BSS color of an EHT PPDU. A simple solution for this is to use the reserved bit in HE-SIGA, and set this bit to the Unreserved value in order to indicate that the PPDU is an EHT PPDU and not an HE PPDU, and to make sure that:
  the BSS color field and the TxOP duration field are in the same bit location in EHT-SIG-A
  HE STAs know that this PPDU is not an HE PPDU but that they can receive the BSS color and TxOP duration field.

For instance, the EHT-SIGA preamble is a 2 or 3 OFDM symbol duration, but the CRC, the BSS color and TxOP duration fields are in the exact same bit location, and the reserved bit indicates that the PPDU is an EHT-PPDU. The CRC at the end of HE-SIGA2 encodes the 2 first OFDM symbols as in HE, and if there is a 3rd HE-SIGA3, there is a CRC specifically for it. Note that all the fields present in HE-SIGA1 and 2 can be identical in EHT-SIGA1 and 2 or only a portion of them.

With assumption 1, HE STA are able to classify the PPDU as intra or inter-PPDU based on the BSS color field, even if the PPDU is an EHT PPDU. Such PPDU may be referred to as an EHT Compatible PPDU.

In one or more embodiments, a BSS Color for Multi-AP UL operation system may facilitate that the EHT preamble has a different classification mechanism, and an HE STA cannot not read the EHT-SIGA and cannot read the BSS Color field. It will then not be able to classify the PPDU as inter or intra-PPDU. Such PPDU may be referred to as an EHT Non-Compatible PPDU.

In one or more embodiments, a BSS Color for Multi-AP UL operation system may facilitate that the SAP trigger frame or the frame that initiate the Multi-AP sequence has to force legacy 11ax STAs to not classify the PPDU as neither intra nor inter PPDU, so that SR is not possible. In order to achieve this, the following may be applied:
  The SAP trigger frame is transmitted in non-HT PPDU or in non-HT Duplicate PPDU
  The SAP trigger frame is transmitted in HE PPDU format and the BSS color in HE-SIGA is set to BSS-color 0
  The SAP trigger frame is transmitted in an EHT Non-Compatible PPDU format
  The SAP trigger frame is transmitted in an EHT Compatible PPDU format and the BSS color is set to BSS-color 0.

In one or more embodiments, the DL PPDU sent by a scheduled coordinated AP in response to the SAP trigger frame has also the intention to force legacy 11ax STAs to not classify the PPDU as neither intra nor inter PPDU, so that SR is not possible, if multiple coordinated APs are scheduled on the same 20 MHz channel. In order to achieve this, the following may be applied:
  The DL PPDU is transmitted in an EHT Non-Compatible PPDU format
  The DL PPDU is transmitted in an EHT Compatible PPDU format and the BSS color is set to BSS-color 0.

Figure 9:
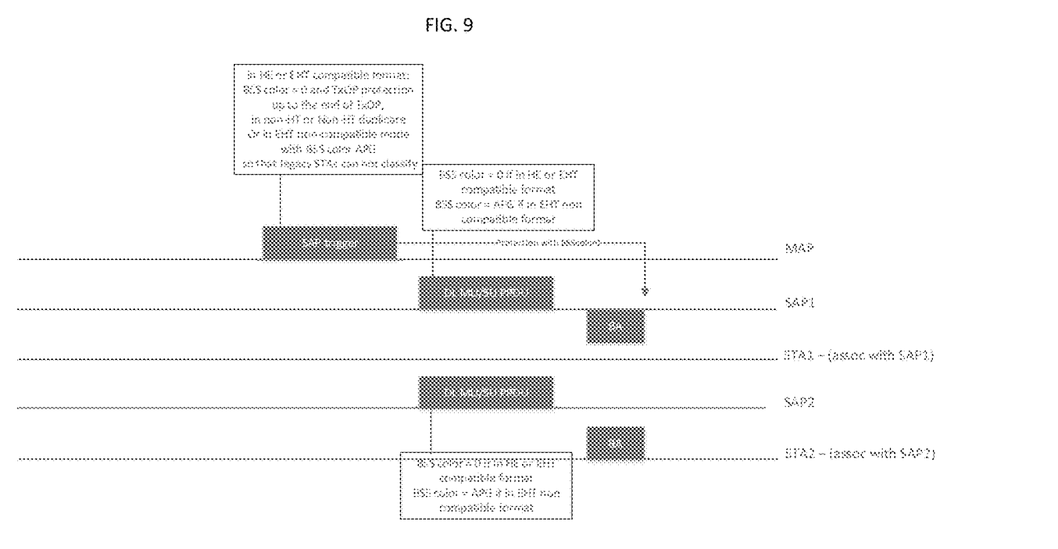
FIG. 9 illustrates a DL PPDU sent by a scheduled coordinated AP in response to the SAP trigger frame in accordance with some embodiments.

As illustrated in FIG. 9 the DL PPDU sent by a scheduled coordinated AP in response to the SAP trigger frame can allow legacy 11ax STAs to classify the PPDU as intra or inter PPDU, so that SR is possible, if only one coordinated AP is scheduled on one 20 MHz channel. In order to achieve this, we can apply the following: The DL PPDU is transmitted by the coordinated AP in an EHT Compatible PPDU format and the BSS color is set to BSS-color of the coordinated AP.

Figure 10:
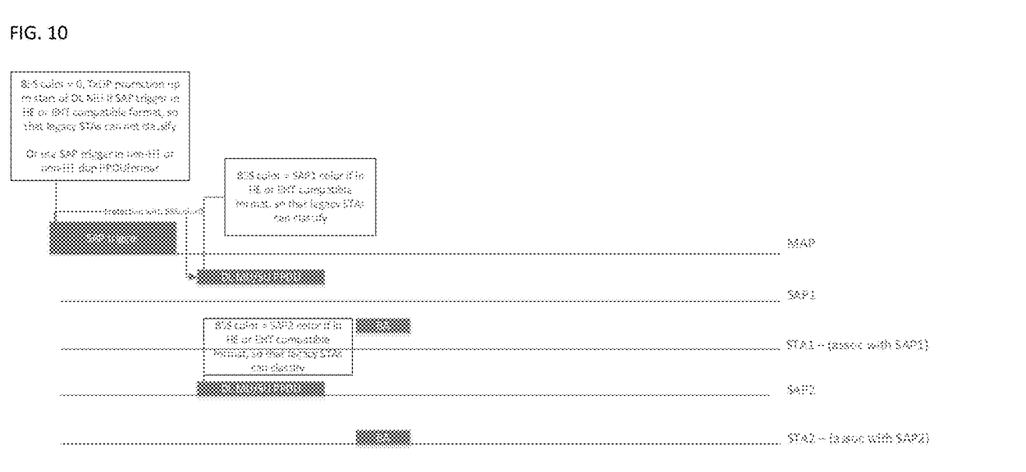
FIG. 10 illustrates a duration of a TxOP in the SAP trigger frame set until the start of the DL MU PPDU in accordance with some embodiments.

As seen in FIG. 10, the duration of the TxOP in the SAP trigger frame can be set only until the start of the DL MU PPDU, and not at the end of the TxOP, if the intention is to disallow SR during the SAP trigger, but then allow SR during the remaining of the TxOP. It is understood that the above descriptions are for purposes of illustration and are not meant to be limiting.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP) station (STA) (AP STA) comprising: processing circuitry; and memory, wherein the processing circuitry is to configure the AP STA to operate as a multi-AP controller in a multi-AP network,
wherein the processing circuitry is to encode a multi-AP group formation message for transmission to APs in the multi-AP network, the multi-AP group formation message encoded to notify the APs of the formation of an extremely-high throughput (EHT) multi-AP group, to designate whether an AP is a member of an EHT multi-AP group, and whether an AP can take the role of a coordinator AP or coordinated AP within the EHT multi-AP group,
wherein when the AP is operating as the coordinator AP, the processing circuitry is further configured to:
encode an AP trigger frame for transmission to the coordinated APs in the multi-AP network, the AP trigger frame to trigger physical layer (PHY) and medium-access control layer (MAC) parameter synchronization for triggering a simultaneous transmission of aggregated MAC protocol data units (A-MPDUs) by the coordinator AP and the coordinated APs,
wherein the A-MPDUs of the simultaneous transmission have same PHY parameters for PHY parameter synchronization.

2. The apparatus of claim 1 wherein if the multi-AP group formation message indicates that the AP STA is designated as the coordinator of the multi-AP group, the processing circuitry is further configured to encode the multi-AP group formation message to designate the other APs as coordinated APs of the EHT multi-AP group.

3. The apparatus of claim 2, wherein the EHT multi-AP group is a subset of the multi-AP network, and
wherein the EHT multi-AP group is one of a plurality of EHT multi-AP groups within the multi-AP network.

4. The apparatus of claim 3 wherein the processing circuitry is configured to select APs of the multi-AP network for inclusion in the EHT multi-AP group based on network topology, capabilities of the APs, and link conditions.

5. An apparatus of an access point (AP) station (STA) (AP STA) comprising: processing circuitry; and memory, wherein the processing circuitry is to configure the AP STA to operate as a multi-AP controller in a multi-AP network,
wherein the processing circuitry is to encode a multi-AP group formation message for transmission to APs in the multi-AP network, the multi-AP group formation message encoded to notify the APs of the formation of an extremely-high throughput (EHT) multi-AP group, to designate whether an AP is a member of an EHT multi-AP group, and whether an AP can take the role of a coordinator AP or coordinated AP within the EHT multi-AP group,
wherein for multi-AP joint processing, the processing circuitry is further configured to:
encode an AP trigger frame for transmission to the APs in the multi-AP network, the AP trigger frame to trigger physical layer (PHY) and medium-access control layer (MAC) parameter synchronization, the AP trigger frame to trigger transmission of aggregated MAC protocol data units (A-MPDUs) by the APs, the A-MPDUs to include MAC parameters and PHY parameters indicated in the AP Trigger frame; and
decode the A-MPDUs received from the APs.

6. The apparatus of claim 5 wherein the AP trigger frame includes a multi-AP STA indication to be used as a receiver address (RA) for a joint transmission.

7. The apparatus of claim 5, wherein MAC parameters for the MAC synchronization include a MAC header information comprising frame control, duration, sequence control, quality-of-service (QoS) control and high-throughput (HT) control.

8. The apparatus of claim 7, wherein the MAC parameters for the MAC synchronization further include MAC security header information comprising a packet number (PN) and a key identity (ID).

9. The apparatus of claim 8, wherein PHY parameters for the PHY synchronization include a scrambling seed, a modulation and coding scheme (MCS), a coding rate, a guard interval (GI), a long-training field (LTF) length, LTF symbols, a PHY format, a transmission PHY preamble, and PHY padding or a packet extension.

10. The apparatus of claim 5, wherein when the multi-AP joint processing is to be performed by the AP STA, the processing circuitry is configured to decode signaling provided the APs of the multi-AP network, the signalling from each of the APs to indicate a multi-AP basic-service set (BSS) color and a multi-AP BSSID.

11. The apparatus of claim 1 wherein the processing circuitry comprises a baseband processor, and wherein the memory is configured to store the multi-AP group formation message.

12. A non-transitory computer-readable storage medium that stores instructions for execution by processing circuitry of an access point (AP) station (STA) (AP STA) to configure the AP STA to operate as a multi-AP controller in a multi-AP network,
wherein the processing circuitry is to encode a multi-AP group formation message for transmission to APs in the multi-AP network, the multi-AP group formation message encoded to notify the APs of the formation of an extremely-high throughput (EHT) multi-AP group, to designate whether an AP is a member of an EHT multi-AP group, and whether an AP can take the role of a coordinator AP or coordinated AP within the EHT multi-AP group,
wherein when the AP is operating as the coordinator AP, the processing circuitry is further configured to:
encode an AP trigger frame for transmission to the coordinated APs in the multi-AP network, the AP trigger frame to trigger physical layer (PHY) and medium-access control layer (MAC) parameter synchronization for triggering a simultaneous transmission of aggregated MAC protocol data units (A-MPDUs) by the coordinator AP and the coordinated APs, wherein the A-MPDUs of the simultaneous transmission have same PHY parameters for PHY Parameter synchronization.

13. The non-transitory computer-readable storage medium of claim 12 wherein if the multi-AP group formation message indicates that the AP STA is designated as the coordinator of the multi-AP group, the processing circuitry is further configured to encode the multi-AP group formation message to designate the other APs as coordinated APs of the EHT multi-AP group.

14. The non-transitory computer-readable storage medium of claim 13, wherein the EHT multi-AP group is a subset of the multi-AP network, and
wherein the EHT multi-AP group is one of a plurality of EHT multi-AP groups within the multi-AP network.

15. The non-transitory computer-readable storage medium of claim 14 wherein the processing circuitry is configured to select APs of the multi-AP network for inclusion in the EHT multi-AP group based on network topology, capabilities of the APs, and link conditions.

16. A non-transitory computer-readable storage medium that stores instructions for execution by processing circuitry of an access point (AP) station (STA) (AP STA) to configure the AP STA to operate as a multi-AP controller in a multi-AP network,
wherein the processing circuitry is to encode a multi-AP group formation message for transmission to APs in the multi-AP network, the multi-AP group formation message encoded to notify the APs of the formation of an extremely-high throughput (EHT) multi-AP group, to designate whether an AP is a member of an EHT multi-AP group, and whether an AP can take the role of a coordinator AP or coordinated AP within the EHT multi-AP group,
wherein for multi-AP joint processing, the processing circuitry is further configured to:
encode an AP trigger frame for transmission to the APs in the multi-AP network, the AP trigger frame to trigger physical layer (PHY) and medium-access control layer (MAC) parameter synchronization, the AP trigger frame to trigger transmission of aggregated MAC protocol data units (A-MPDUs) by the APs, the A-MPDUs to include MAC parameters and PHY parameters indicated in the AP Trigger frame; and
decode the A-MPDUs received from the APs.

17. The non-transitory computer-readable storage medium of claim 16 wherein the AP trigger frame includes a multi-AP STA indication to be used as a receiver address (RA) for a joint transmission.

18. The non-transitory computer-readable storage medium of claim 16, wherein MAC parameters for the MAC synchronization include a MAC header information comprising frame control, duration, sequence control, quality-of-service (QoS) control and high-throughput (HT) control, and
wherein the MAC parameters for the MAC synchronization further include MAC security header information comprising a packet number (PN) and a key identity (ID).

19. The non-transitory computer-readable storage medium of claim 18, wherein PHY parameters for the PHY synchronization include a scrambling seed, a modulation and coding scheme (MCS), a coding rate, a guard interval (GI), a long-training field (LTF) length, LTF symbols, a PHY format, a transmission PHY preamble, and PHY padding or a packet extension.

20. The non-transitory computer-readable storage medium of claim 16, wherein when the multi-AP joint processing is to be performed by the AP STA, the processing circuitry is configured to decode signaling provided the APs of the multi-AP network, the signalling from each of the APs to indicate a multi-AP basic-service set (BSS) color and a multi-AP BSSID.

* * * * *